United States Patent
Hachisuga

(10) Patent No.: US 11,483,444 B2
(45) Date of Patent: Oct. 25, 2022

(54) OPTICAL DEVICE, IMAGE READING APPARATUS, AND IMAGE FORMING APPARATUS FOR SUPPRESSING STRAY LIGHT USING LIGHT SHIELDING BODY THAT OVERLAP ROWS OF LENS ARRAY AND COVERED BY REGULATING BODY WITH THROUGH HOLES

(71) Applicant: FUJIFILM Business Innovation Corp., Tokyo (JP)

(72) Inventor: Masaki Hachisuga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/984,098

(22) Filed: Aug. 3, 2020

(65) Prior Publication Data

US 2021/0234986 A1    Jul. 29, 2021

(30) Foreign Application Priority Data

Jan. 27, 2020 (JP) .............................. JP2020-011092

(51) Int. Cl.
    *H04N 1/03* (2006.01)
    *H04N 1/028* (2006.01)

(52) U.S. Cl.
    CPC . *H04N 1/0306* (2013.01); *H04N 2201/02431* (2013.01); *H04N 2201/02493* (2013.01)

(58) Field of Classification Search
    CPC .............. H04N 1/0306; H04N 1/0312; H04N 2201/02431; H04N 2201/02493; H04N 1/02895; G02B 3/0062; G02B 3/0068

USPC ............... 358/474; 359/619–622, 741, 201.1
See application file for complete search history.

(56) References Cited

U.S. PATENT DOCUMENTS

| | | | |
|---|---|---|---|
| 8,488,214 B2 | 7/2013 | Kaise | |
| 2001/0028506 A1* | 10/2001 | Fujimoto | H04N 1/0318 359/622 |
| 2013/0038915 A1* | 2/2013 | Kusaka | G02B 3/0062 358/474 |
| 2013/0235434 A1* | 9/2013 | Akiyama | G02B 3/0068 358/474 |
| 2015/0109676 A1* | 4/2015 | Kobayashi | G02B 3/005 359/619 |

FOREIGN PATENT DOCUMENTS

| | | |
|---|---|---|
| JP | 2001352429 | 12/2001 |
| JP | 2011223190 | 11/2011 |
| JP | 2015022163 A * | 2/2015 |

* cited by examiner

*Primary Examiner* — Chad Dickerson
(74) *Attorney, Agent, or Firm* — JCIPRNET

(57) ABSTRACT

An optical device includes a lens body including plural lenses of which optical axes are arranged alongside each other, and having an intermediate image forming surface for forming an erect real image of equal magnification formed in an optical path, a light shielding body that is provided to face a light incident surface of the lens body, and includes a transmitting portion that is positioned on the optical axes of the plural lenses and transmits light and a light shielding unit that is positioned on a portion other than the optical axes of the plural lenses and shields the passage of light, and a regulating body that is provided to face a light incident surface of the light shielding body, includes an opening narrower than the transmitting portion, and regulates a part of light toward the transmitting portion.

9 Claims, 11 Drawing Sheets

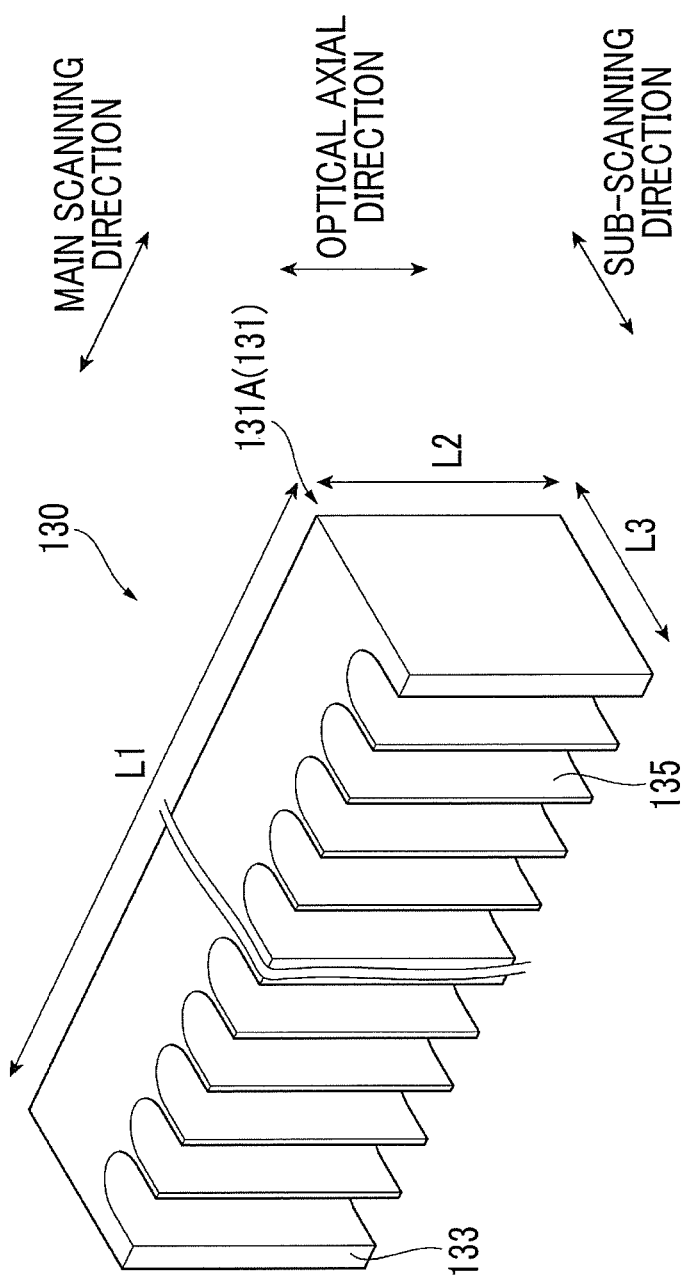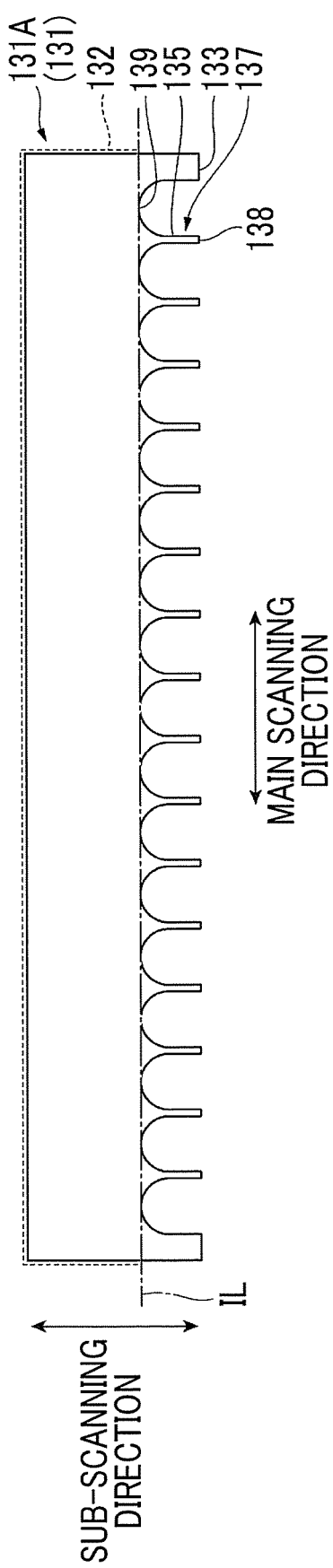

CIRCLE

SEMICIRCLE 0.75

SEMICIRCLE 0.6

LINE 0.18

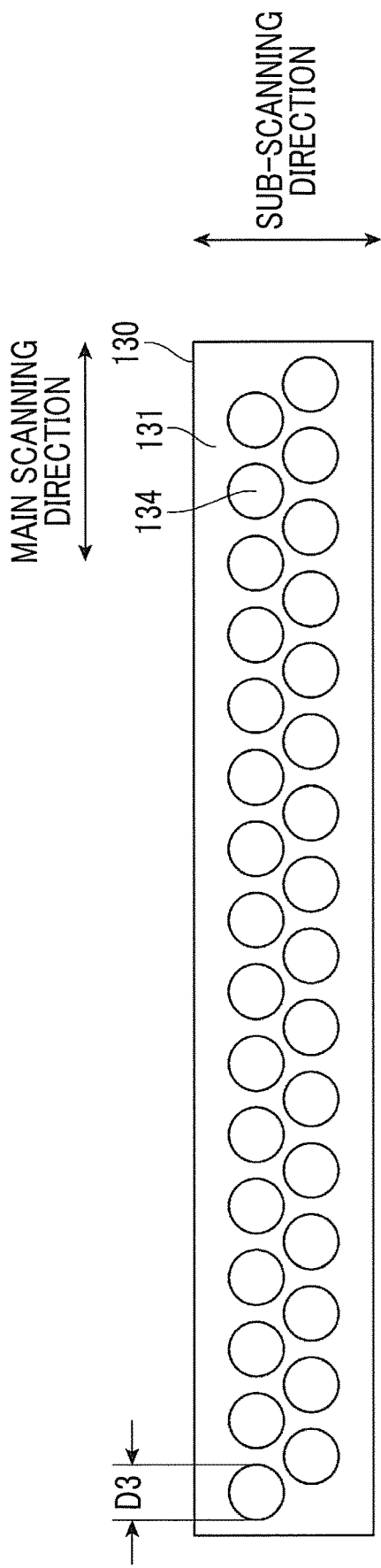
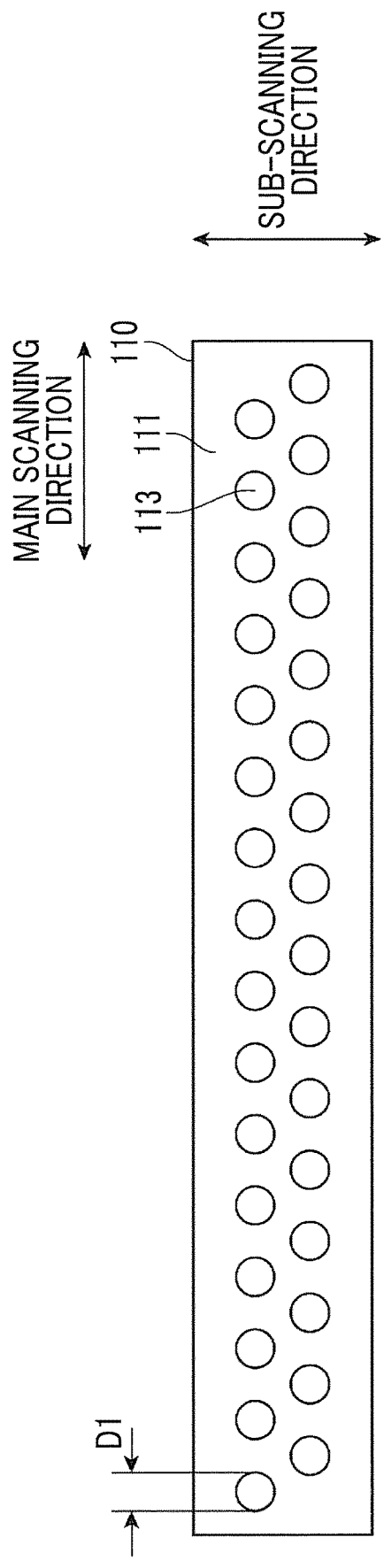

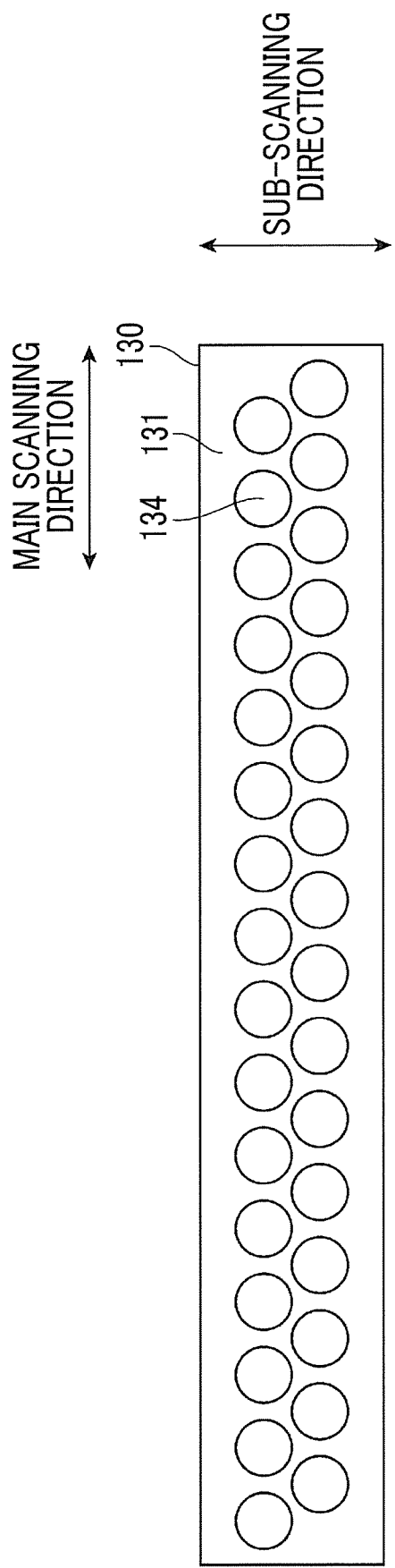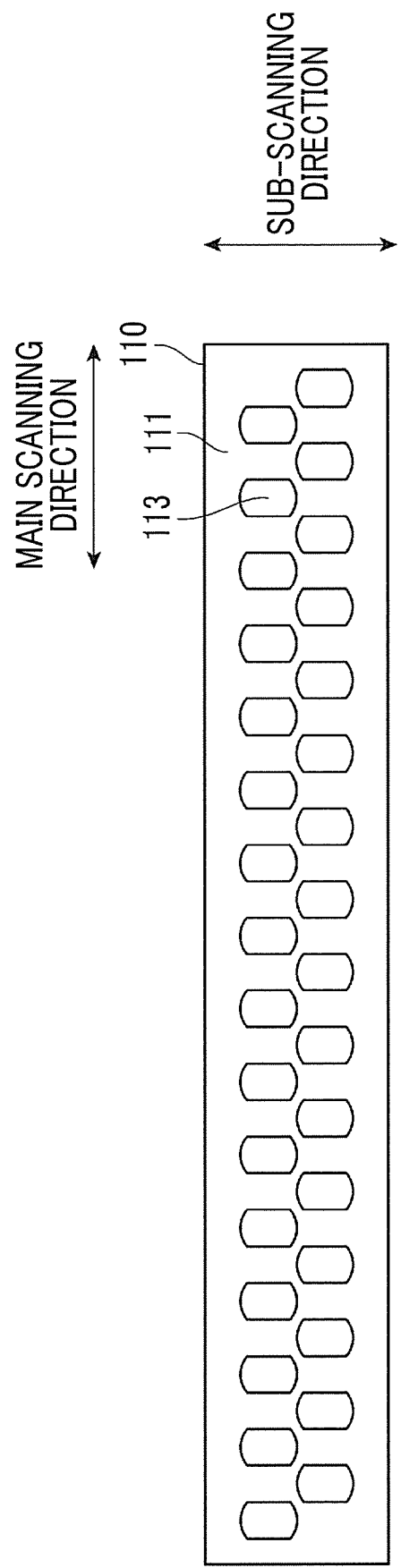

OPTICAL DEVICE, IMAGE READING APPARATUS, AND IMAGE FORMING APPARATUS FOR SUPPRESSING STRAY LIGHT USING LIGHT SHIELDING BODY THAT OVERLAP ROWS OF LENS ARRAY AND COVERED BY REGULATING BODY WITH THROUGH HOLES

CROSS-REFERENCE TO RELATED APPLICATIONS

This application is based on and claims priority under 35 USC 119 from Japanese Patent Application No. 2020-011092 filed Jan. 27, 2020.

BACKGROUND

(i) Technical Field

The present invention relates to an optical device, an image reading apparatus, and an image forming apparatus.

(ii) Related Art

JP2001-352429A discloses a lens array unit including a first lens array formed by integrally forming a plurality of first lenses and a first holder unit that holds the plurality of first lenses with a translucent resin, and a second lens array formed by integrally forming a plurality of second lenses and a second holder unit that holds the plurality of second lenses with a translucent resin, in which the first lens array and the second lens array are arranged to overlap each other so that the lenses of the lens arrays face each other, and a light shielding member made of black resin having a light shielding property and provided with a plurality of through-holes is arranged to overlap with the first lens array such that the plurality of through-holes are in front of a first lens surface of each of the first lenses provided in the first lens array.

SUMMARY

For suppressing stray light, a light shielding body which shields a part of light passing through the lens may be provided to a lens body including a plurality of lenses arranged such that optical axes are arranged alongside each other. Also, as such a light shielding body, a configuration in which a through-hole through which light passes is provided at a position facing each lens is known. However, by only providing the through-hole in the light shielding body, a focal depth of the erect real image of equal magnification, which is obtained by light passing through the through-hole of the light shielding body and the lens body, may be shallow.

Aspects of non-limiting embodiments of the present disclosure relate to an optical device, an image reading apparatus, and an image forming apparatus that increase a focal depth of an obtained erect real image of equal magnification as compared with a case where the present configuration is not adopted.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an optical device includes a lens body including a plurality of lenses of which optical axes are arranged alongside each other, and having an intermediate image forming surface for forming an erect real image of equal magnification formed in an optical path, a light shielding body that is provided to face a light incident surface of the lens body, and includes a transmitting portion that is positioned on the optical axes of the plurality of lenses and transmits light and a light shielding unit that is positioned on a portion other than the optical axes of the plurality of lenses and shields the passage of light, and a regulating body that is provided to face a light incident surface of the light shielding body, includes an opening narrower than the transmitting portion, and regulates a part of light toward the transmitting portion.

BRIEF DESCRIPTION OF THE DRAWINGS

Exemplary embodiment(s) of the present invention will be described in detail based on the following figures, wherein:

FIGS. 4A and 4B are diagrams for explaining a light shielding wall;

FIGS. 9A and 9B are diagrams for explaining the relationship between a wall through-hole and a film through-hole in the modification example of the light shielding wall;

FIGS. 11A and 11B are diagrams for explaining the relationship between a wall through-hole and a film through-hole in a modification example of the light shielding film.

DETAILED DESCRIPTION

Figure 1:
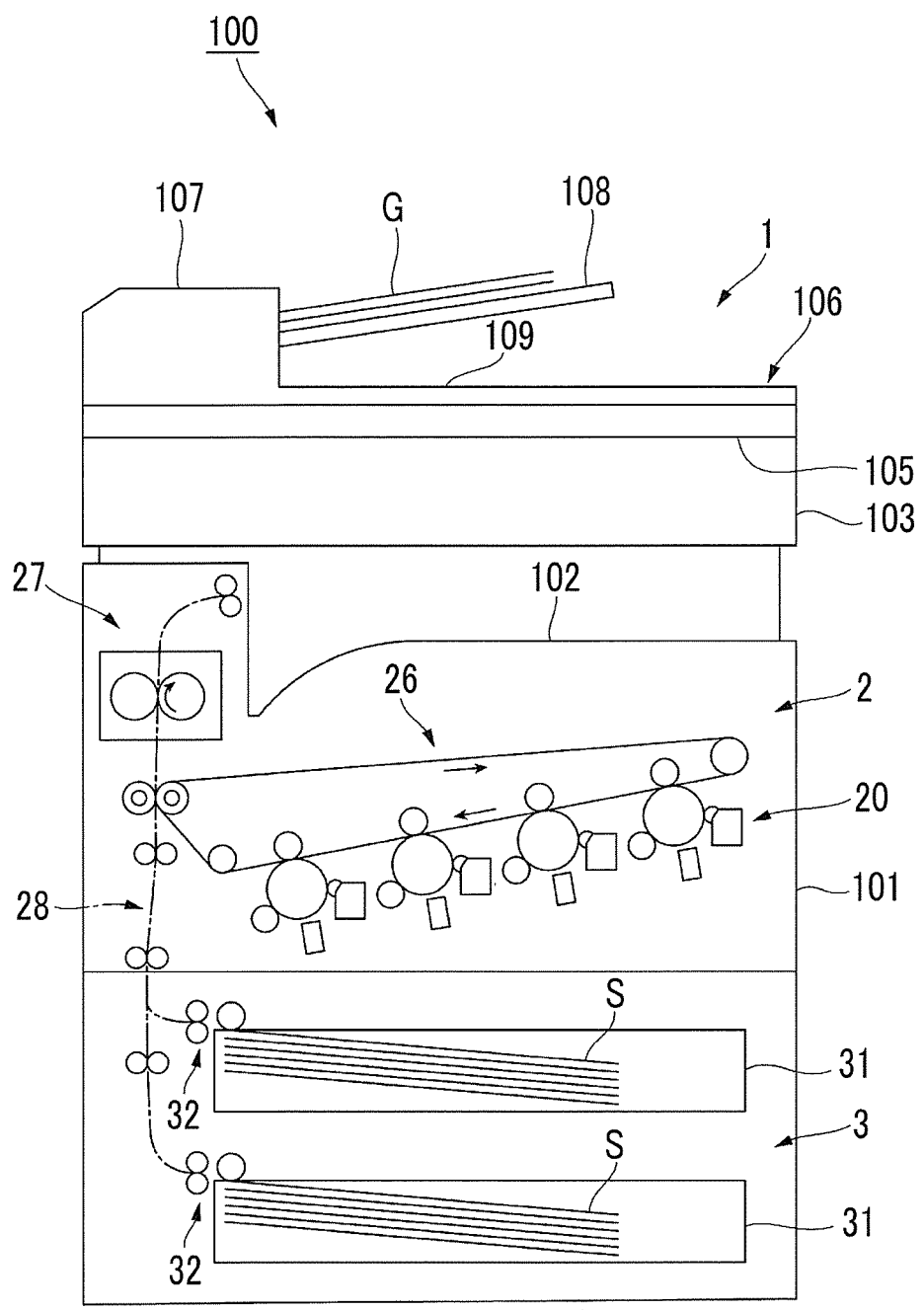
FIG. 1 is a schematic configuration diagram of an image forming apparatus to which the present exemplary embodiment is applied.

Hereinafter, exemplary embodiments of the present invention will be described in detail with reference to drawings. The size and thickness of each part in the drawings referred to in the following description may be different from the actual size.

Image Forming Apparatus 100

FIG. 1 is a schematic configuration diagram of an image forming apparatus 100 to which the present exemplary embodiment is applied.

As shown in FIG. 1, the image forming apparatus 100 includes a document reading apparatus 1 that reads information of a document G, an image forming unit 2 that forms an image on a recording sheet S based on the information on the document (read image) read by the document reading apparatus 1, and a paper feeding unit 3 that feeds the recording sheet S supplied to the image forming unit 2. The image forming apparatus 100 accommodates the image forming unit 2 and the paper feeding unit 3 in a main body 101, and has the document reading apparatus 1 disposed above the main body 101. The main body 101 has, on an upper surface portion thereof, a discharging and accommodating unit 102 that discharges and accommodates the recording sheet S on which an image is formed.

The document reading apparatus 1 has a housing 103. Also, the document reading apparatus 1 has, on the upper surface portion of the housing 103, a light transparent document placing table 105 on which the document G is placed, and a document cover 106 that covers the document placing table 105 and can be opened and closed with respect to the housing 103. On the document cover 106, an auto document feeding unit 107 that transports the document G to a reading position and discharges the read document G, a document tray 108 on which the document G transported from the auto document feeding unit 107 is placed, and an accommodating unit 109 that accommodates the document G discharged from the auto document feeding unit 107 are provided.

The image forming unit 2 includes an image formation unit 20 that forms toner images having colors of yellow (Y), magenta (M), cyan (C), and black (K), an intermediate transfer unit 26 that transports the toner image formed by the image formation unit 20 to transfer on the recording sheet S, and a fixing unit 27 that fixes the toner image transferred on the recording sheet S by the intermediate transfer unit 26, by an electrophotographic method. The image forming unit 2 may adopt units that form an image by, for example, an inkjet method other than the electrophotographic method.

The paper feeding unit 3 has a drawer type container 31 on which a plurality of the recording sheets S of predetermined sizes or types can be placed, and a feeding device 32 that feeds the recording sheet S accommodated in the container 31 to a transporting path one by one. A supply transporting path 28 through which the recording sheet S fed from the paper feeding unit 3 is transported to a secondary transfer position is disposed between the paper feeding unit 3 and the image forming unit 2.

Hereinafter, a basic operation of the image forming apparatus 100 will be described.

First, in the document reading apparatus 1, the document G is placed on any one of the document placing table 105 or the document tray 108 by a user. Then, in a case where the user operates an operation button (not shown) or the like, the document reading apparatus receives an instruction of document reading, then the reading operation with respect to the document G starts. That is, the document reading apparatus 1 acquires reading information on the document G. Then, the image forming unit 2 executes an image forming operation based on the reading information on the document G received from the document reading apparatus 1. At this time, the recording sheet S is fed from the paper feeding unit 3 in accordance with the operation of the image forming unit 2. Then, the recording sheet S is discharged to the discharging and accommodating unit 102 after the toner image is fixed to the recording sheet in the image forming unit 2. The image forming operations described above are repeated by the number of documents G and the number of image forming sheets in the same manner.

Document Reading Apparatus 1

Figure 2:
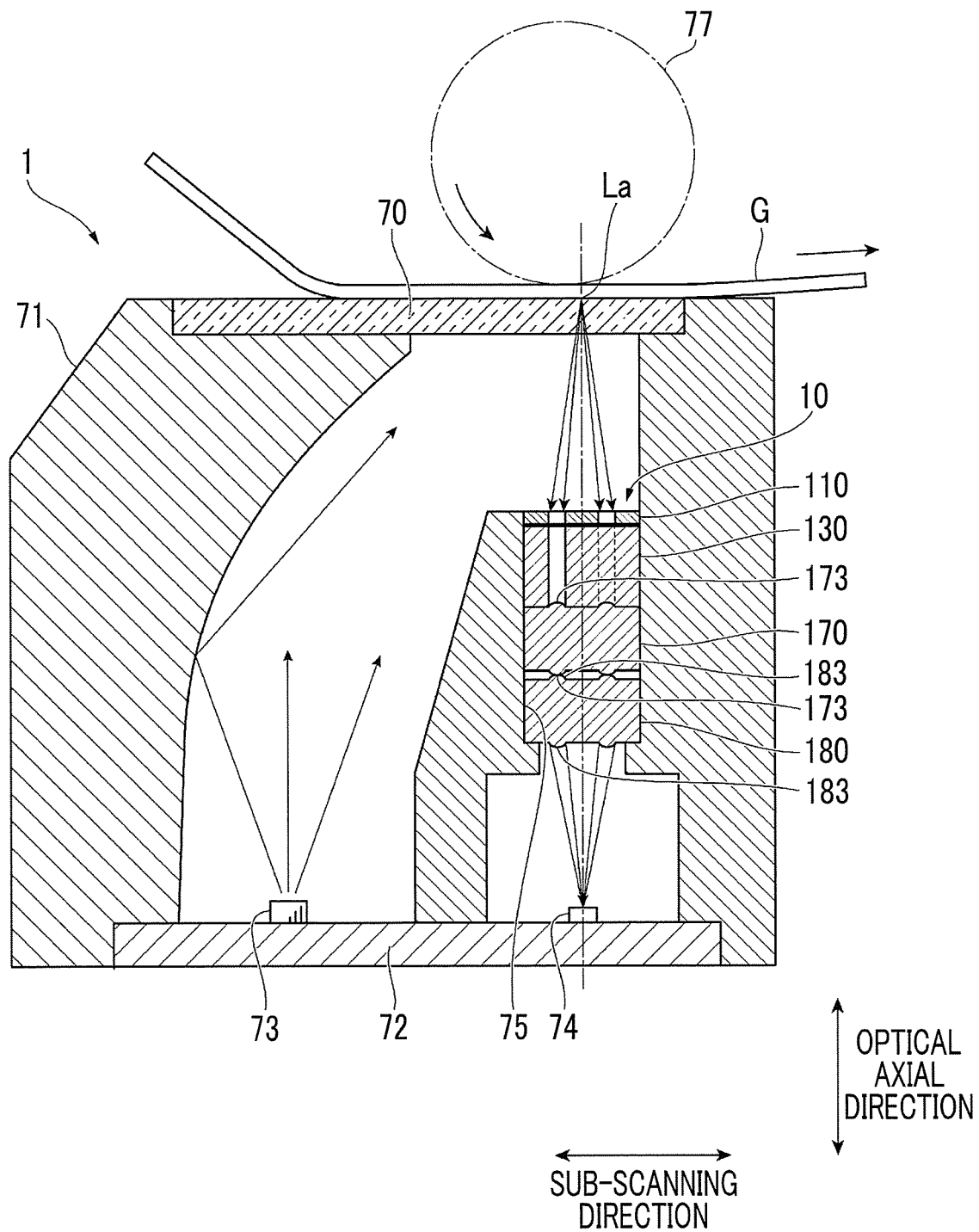
FIG. 2 is a schematic configuration diagram of an image reading apparatus to which the present exemplary embodiment is applied.

FIG. 2 is a schematic configuration diagram of a document reading apparatus 1 to which the present exemplary embodiment is applied.

Hereinafter, the document reading apparatus 1 to which the present exemplary embodiment is applied will be described with reference to FIG. 2. As shown in FIG. 2, the document reading apparatus 1 includes a transparent plate 70, a synthetic resin case 71 supporting the transparent plate 70, and a substrate 72 assembled to the bottom of the case 71. On a surface of the substrate 72, a plurality of spot light sources 73 arranged in rows at intervals in a main scanning direction (a direction orthogonal to a paper surface), and a plurality of light receiving elements 74 arranged in the same direction with a plurality of light sources 73 are provided. Each of the light sources 73 is constituted by using a light emitting diode. Each of the light receiving elements 74 has a photoelectric conversion function, and in a case where light is received, the light receiving element 74 outputs a signal of an output level corresponding to a light receiving amount, specifically, outputs an image signal. In the present exemplary embodiment, a plurality of spot light sources 73 is an example of an irradiation unit, and a plurality of light receiving elements 74 is an example of a light receiving unit.

Here, the document reading apparatus 1 includes a lens array unit 10 between the transparent plate 70 and each light receiving element 74. Although a detailed configuration of the lens array unit 10 will be described later, the lens array unit 10 as shown in FIG. 2 is disposed in a recessed groove 75 provided in the case 71. Also, on the surface portion of the transparent plate 70 as shown in FIG. 2, a portion facing the lens array unit 10 is an image reading region La extending in the main scanning direction. The image reading region La is irradiated with light from each light source 73.

In the document reading apparatus 1, light from the light source 73 is emitted to the document G guided onto the surface of the transparent plate 70 by the auto document feeding unit 107 (see FIG. 1). Reflected light of light emitted to the document G proceeds toward the lens array unit 10. Then, by the operation of the lens array unit 10, the image for one line of the document G in the image reading region La is formed on a plurality of light receiving elements 74 in an erect equal-magnified manner. Therefore, a plurality of light receiving elements 74 outputs the image signals by one line corresponding to the image of the document G. Such a reading process is repeatedly performed multiple times in the process that the document G is transported by, for example, a platen roller 77 included in the auto document feeding unit 107 in a sub-scanning direction.

In the following description, the direction from the image reading region La toward the light receiving element 74, that is, a vertical direction in FIG. 2 may refer to as an optical axial direction. In the present exemplary embodiment, the main scanning direction is an example of an arrangement direction, and the sub-scanning direction is an example of an intersection direction.

Lens Array Unit 10

Figure 3:
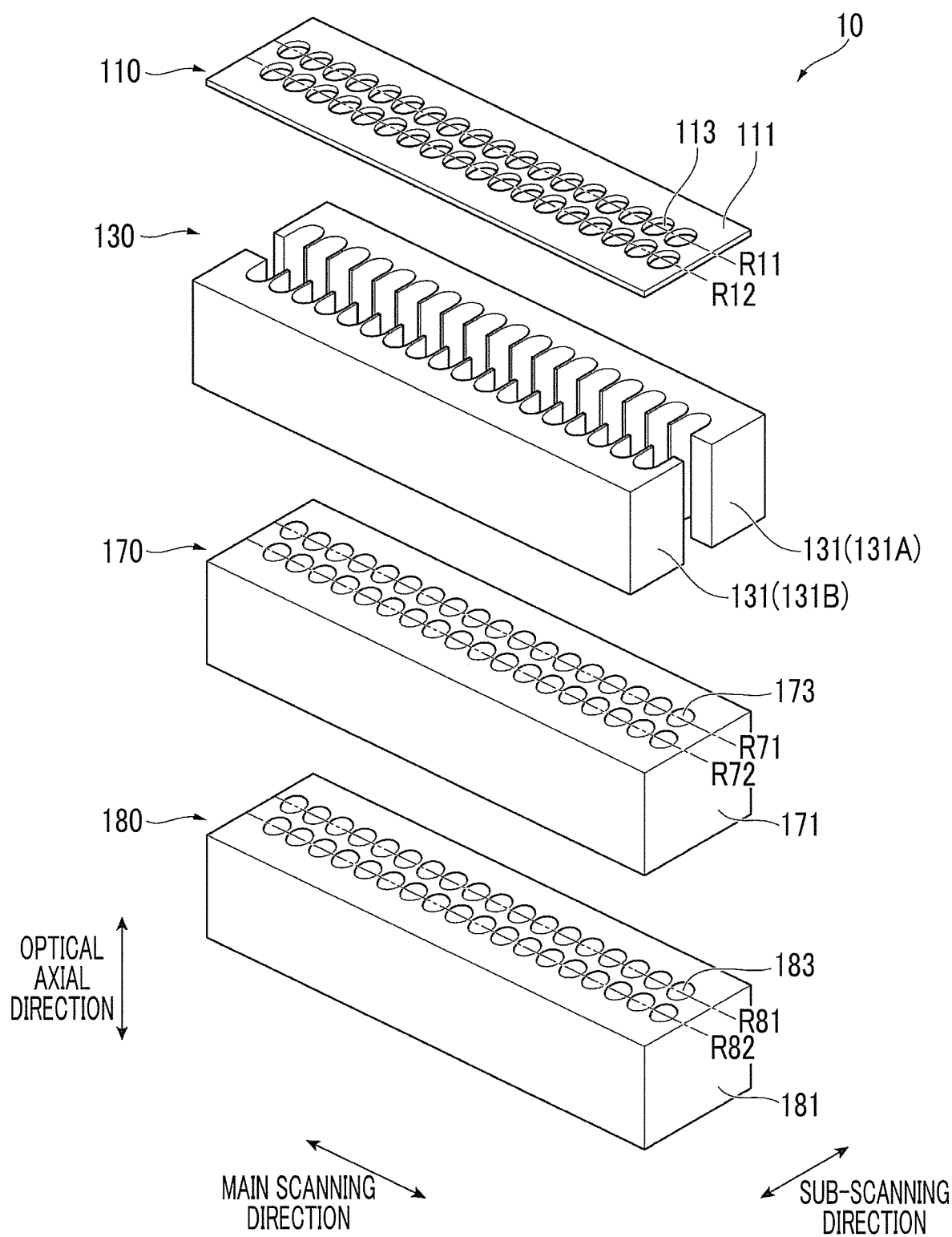
FIG. 3 is an exploded perspective view of a lens array unit to which the present exemplary embodiment is applied.

FIG. 3 is an exploded perspective view of a lens array unit 10 to which the present exemplary embodiment is applied. Hereinafter, the lens array unit 10 to which the present exemplary embodiment is applied will be described with reference to FIG. 3.

As shown in FIG. 3, the lens array unit 10 includes a light shielding film 110, a light shielding wall 130, a first lens array 170, and a second lens array 180. More specifically, in the lens array unit 10 as shown in FIG. 3, the light shielding film 110, the light shielding wall 130, the first lens array 170, and the second lens array 180 are stacked on top of each other in this order, and are bonded by an adhesive or the like so as to be integrated with each other. In a case where the lens array unit 10 is attached to the document reading apparatus 1, the light shielding film 110 faces the transparent plate 70, and the second lens array 180 faces a plurality of light receiving elements 74. Hereinafter, each member included in the lens array unit 10 will be described.

First Lens Array 170 and Second Lens Array 180

First, the first lens array 170 and the second lens array 180 will be described.

Each of the first lens array 170 and the second lens array 180 that are examples of the lens body is a member having substantially rectangular parallelepiped shape. More specifically, the first lens array 170 and the second lens array 180 as shown are a pair of lens members and have shapes coinciding with each other.

The first lens array 170 that is an example of a first lens body has a substantially rectangular parallelepiped first support member 171, and a plurality of first lenses 173 formed on the front and back surfaces of the first support member 171. A plurality of first lenses 173 are configured such that optical axes thereof are arranged alongside each other. Regarding the description that the optical axes of a plurality of first lenses 173 are arranged alongside each other, each of the first lenses 173 need only cause the image for one line of the document G in the image reading region La to be formed on a plurality of light receiving elements 74 in an erect equal-magnified manner, and the optical axes of a plurality of first lenses 173 may not only be parallel to each other, but also be misaligned with each other. Also, a plurality of first lenses 173 are arranged in a first row R71 and a second row R72 along the main scanning direction. A plurality of first lenses 173 are disposed in a staggered manner. That is, the first lenses 173 which constitute the first row R71 and the first lenses 173 which constitute the second row R72 are shifted from each other in the main scanning direction. The first lenses 173 in the first row R71 are disposed at predetermined intervals, that is, pitches. Also, the first lenses 173 in the second row R72 are disposed at the identical interval with the lenses in the first row R71. In the first lens array 170 shown in FIG. 3, the surface facing the upper side of the figure is a light incident surface of the first lens array 170, the surface facing the lower side of the figure is a light emitting surface of the first lens array 170.

The second lens array 180 that is an example of a second lens body has a substantially rectangular parallelepiped second support member 181, and a plurality of second lenses 183 formed on the front and back surfaces of the second support member 181. A plurality of second lenses 183 are configured such that optical axes thereof are arranged alongside each other. Regarding the description that the optical axes of a plurality of second lenses 183 are arranged alongside each other, each of the second lenses 183 need only cause the image for one line of the document G in the image reading region La to be formed on a plurality of light receiving elements 74 in an erect equal-magnified manner, and the optical axes of a plurality of second lenses 183 may not only be parallel to each other, but also be misaligned with each other. Also, a plurality of second lenses 183 are arranged in a first row R81 and a second row R82 along the main scanning direction. A plurality of second lenses 183 are disposed in a staggered manner. That is, the second lenses 183 which constitute the first row R81 and the second lenses 183 which constitute the second row R82 are shifted from each other in the main scanning direction. The second lenses 183 in the first row R81 are disposed at predetermined intervals. Also, the second lenses 183 in the second row R82 are disposed at the identical interval with the intervals in the first row R81. In the second lens array 180 shown in FIG. 3, the surface facing the upper side of the figure is a light incident surface of the second lens array 180, the surface facing the lower side of the figure is a light emitting surface of the second lens array 180.

In the shown example, the first lens array 170 and the second lens array 180 are disposed such that each of the first lenses 173 and each of the second lenses 183 face each other. That is, the emitting surface of each first lens 173 and the incident surface of each second lens 183 face each other. More specifically, the optical axis of the first lens 173 and the optical axis of the second lens 183 are aligned to coincide with each other. The first lens array 170 and the second lens array 180 are integrally formed by injection molding, for example, using an optical resin having a light transmitting property. In the following description, in a case where distinguish between the optical axis of the first lens 173 and the optical axis of the second lens 183 is unnecessary, both may be simply referred to as "an optical axis of the first lens 173".

In the shown example, an intermediate image forming surface is formed in an optical path between the first lens array 170 and the second lens array 180, in other words, between the light emitting surface of the first lens array 170 and the light incident surface of the second lens array 180. By forming the intermediate image forming surface in the region, light entered from the incident surface side of the first lens array 170 passes through the emitting surface of the first lens array 170 and the incident surface of the second lens array 180 and forms an erect real image of equal magnification on the emitting surface side of the second lens array 180.

Although the light emitting surface of the first lens array 170 and the light incident surface of the second lens array 180 are drawn as the emitting surface and the incident surface are almost in contact with each other in FIG. 2, a space is present therebetween actually. The intermediate image forming surface is formed in this space.

Light Shielding Film 110

Hereinafter, the light shielding film 110 will be described. The light shielding film 110 is a long thin plate member.

The light shielding film 110 that is an example of the regulating body includes a plate surface 111 having a substantially rectangular shape in a plan view. A plurality of film through-holes 113 are formed in the plate surface 111. In the example, each film through-hole 113 that is an example of an opening has a substantially circular shape. The positions of film through-holes 113 correspond to the first lens 173 and the second lens 183. That is, each film through-hole 113 is formed at a position through which the optical axis of the first lens 173 passes. Also, the film through-holes 113 are arranged in a first row R11 and a second row R12 along the main scanning direction. More specifically, each optical axis of the first lens 173 corresponds to each film through-hole 113. In the light shielding film 110 shown in FIG. 3, the surface facing the upper side of the figure is a light incident surface of the light shielding film 110, the surface facing the lower side of the figure is a light emitting surface of the light shielding film 110.

In the shown example, the light shielding film 110 is thinner than the light shielding wall 130. That is, the light shielding film 110 has a smaller dimension than the light shielding wall 130 in the optical axial direction. Further, the light shielding film 110 is formed of resin materials mixed with black pigment (for example, an acrylic resin). The light shielding film 110 shields light not contributing to image formation of the first lens 173 and second lens 183. More specifically, the light shielding film 110 is provided on a side opposite the first lens 173 and the second lens 183 in the optical axial direction with the light shielding wall 130 interposed therebetween, in other words, on the upper surface of the light shielding wall 130, and shields a part of light to be directed to the light shielding wall 130. The relationship between the light shielding film 110 and the light shielding wall 130 will be described in detail below.

Light Shielding Wall 130

FIGS. 4A and 4B are diagrams for explaining a light shielding wall 130. More specifically, FIG. 4A is a perspective view of the first wall member 131A and FIG. 4B is a top view of the first wall member 131A.

Figure 5A:
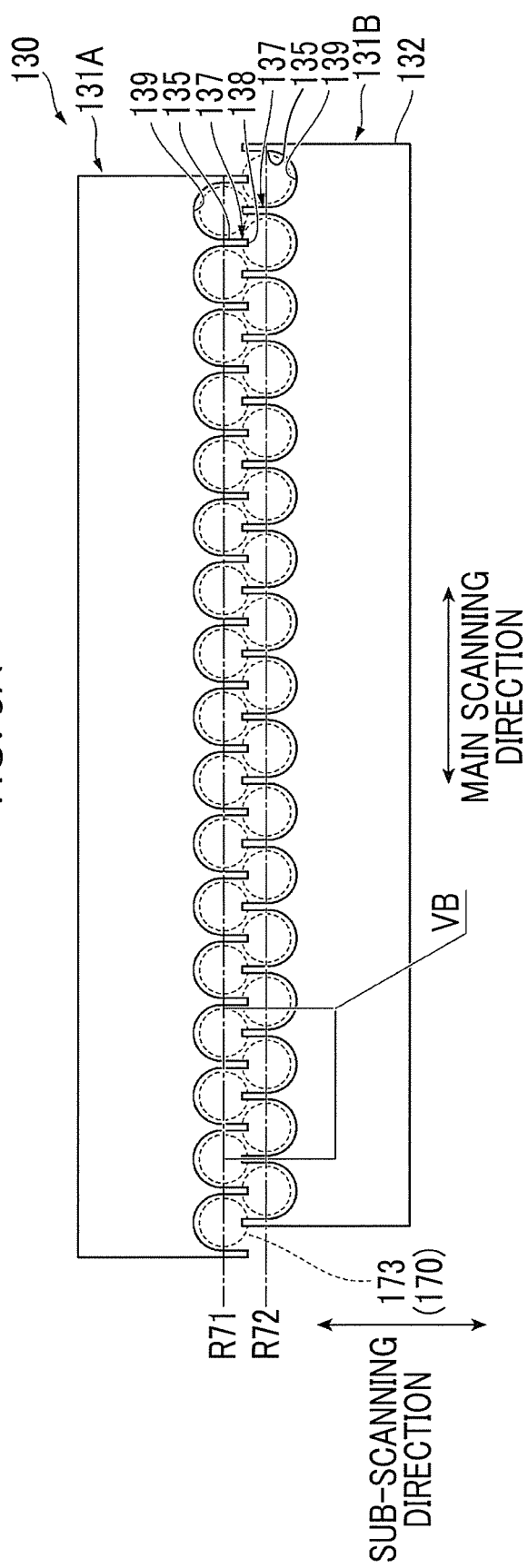
FIGS. 5A and 5B are diagrams for explaining arrangement of the light shielding wall.
Figure 5B:
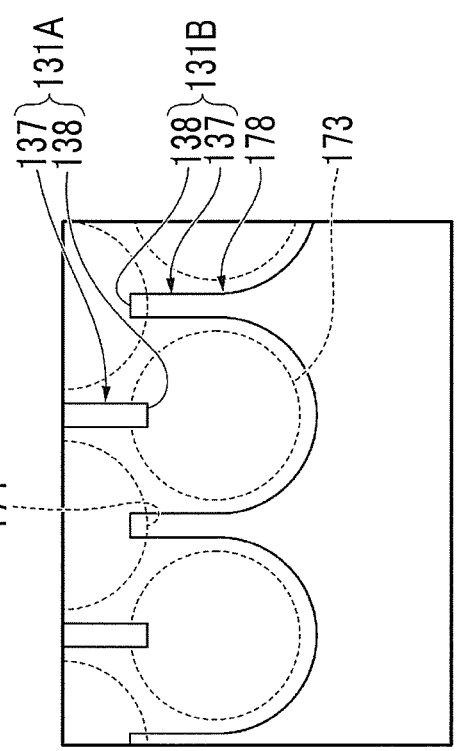

FIGS. 5A and 5B are diagrams for explaining arrangement of the light shielding wall 130. More specifically, FIG. 5A is a diagram showing a positional relationship between the first wall member 131A and the second wall member 131B, and FIG. 5B is an enlarged view along VB of FIG. 5A.

Hereinafter, the light shielding wall 130 will be described with reference to FIG. 3, FIGS. 4A and 4B, and FIGS. 5A and 5B.

As shown in FIG. 3, the light shielding wall 130 that is an example of the light shielding body is configured such that two substantially rectangular parallelepiped wall members 131, that is, the first wall member 131A and the second wall member 131B are arranged. More specifically, the light shielding wall 130 has the first wall member 131A and the second wall member 131B facing each other with the optical axis of the first lens 173 interposed therebetween. The first wall member 131A is an example of a first light shielding body, and the second wall member 131B is an example of a second light shielding body.

The first wall member 131A and the second wall member 131B that are examples of the light shielding unit are formed of a resin material mixed with black pigment (polycarbonate or acrylic resin), for example. In the shown example, the first wall member 131A and the second wall member 131B are the identical materials. Detailed structures will be described as follows with the first wall member 131A as an example.

As shown in FIGS. 4A and 4B, the first wall member 131A is a substantially rectangular parallelepiped member. The first wall member 131A is disposed such that the longitudinal direction thereof is along the main scanning direction. For example, the first wall member 131A has a length L1 in the main scanning direction of 300 mm, a length L2 in the optical axial direction of 5 mm, and a length L3 in the sub-scanning direction of 2 mm. The first wall member 131A has a first side surface 133 whose normal line is along the sub-scanning direction. The first side surface 133 can be regarded as a surface of the first wall member 131A facing the second wall member 131B (see FIG. 3).

The first wall member 131A is a comb-teeth shape having a plurality of walls in the main scanning direction. More specifically, the first wall member 131A has a plurality of optical axis grooves 135 formed in the first side surface 133 along the optical axial direction. Also, a plurality of optical axis grooves 135 are provided in the main scanning direction at predetermined intervals. Each of the plurality of optical axis grooves 135 is formed at a position through which the optical axis of the first lens 173 passes. In addition, the interval between the optical axis grooves 135 in the main scanning direction matches the interval between the first lenses 173 in the first lens array 170, and the interval between the second lenses 183 in the second lens array 180.

As shown in FIG. 4B, the first wall member 131A in which a plurality of optical axis grooves 135 are formed on the first side surface 133 can be regarded as a configuration having a base 132 whose longitudinal direction extends along the main scanning direction, and a plurality of projecting portions 137 projecting in the sub-scanning direction from the base 132. Here, tips 138 of the projecting portions 137 are disposed in the main scanning direction at predetermined intervals. Also, bottom portions 139 of the optical axis grooves 135 are disposed in the main scanning direction at predetermined intervals. The projecting portion 137 of the first wall member 131A is a portion interposed between the optical axis grooves 135 in the main scanning direction, and is a portion on the optical axis side of the first lens 173 from a virtual line IL connecting the bottom portions 139 of the optical axis grooves 135. The base 132 of the first wall member 131A is a portion on the side opposite to the optical axis side of the first lens 173 from the virtual line IL connecting the bottom portions 139 of the optical axis grooves 135. In the example shown in FIG. 4B, the base 132 is a substantially rectangular portion in a plan view. In the first wall member 131A according to the present exemplary embodiment, the base 132 is an example of a first base, and each projecting portion 137 is an example of a first projecting portion. In the second wall member 131B according to the present exemplary embodiment, the base 132 is an example of a second base, and each projecting portion 137 is an example of a second projecting portion.

As shown in FIG. 5A, the first wall member 131A and the second wall member 131B are disposed such that the first side surfaces 133 thereof on which the optical axis groove 135 is formed face each other (see FIG. 4A). As viewed along the optical axial direction shown in FIG. 5A, each of the optical axis grooves 135 is disposed to coincide with the first lens 173 and the second lens 183. In the present exemplary embodiment, in the light shielding wall 130 configured by the first wall member 131A and the second wall member 131B facing each other, a space formed by the absence of the base 132 and a plurality of projecting portions 137 is an example of a transmitting portion and a window portion. More specifically, a plurality of columnar regions, formed by the absence of the base 132 and a plurality of projecting portions 137, have a function as a window portion respectively, and a plurality of window portions configure the transmitting portion. The window portion may have an open shape as in the present exemplary embodiment instead of a closed shape such as a circular shape. Stated another way, the concept of the window portion according to the present exemplary embodiment includes the shape with a frame (the closed shape) and the shape without a frame (the open shape). An example of the window portion having the closed shape will be described in Modification Example 2 below.

In the lens array unit 10 according to the present exemplary embodiment, the light shielding film 110 is disposed on the incident surface side of the light shielding wall 130 configured by the first wall member 131A and the second wall member 131B. A region, immediately above the optical axis of the first lens 173, of the transmitting portion provided in the light shielding wall 130 is exposed without being covered with a plurality of film through-holes 113 provided in the light shielding film 110. On the other hand, a region, other than immediately above the optical axis of the first lens 173, of the transmitting portion provided in the light shielding wall 130 is covered with a plurality of film through-holes 113 provided in the light shielding film 110. An opening formed by a plurality of film through-holes 113 provided in the light shielding film 110 is narrower than a window portion configuring the transmitting portion provided in the light shielding wall 130. From another viewpoint, the light shielding film 110 according to the present exemplary embodiment can be considered to cover a part of the region in which the first wall member 131A and the second wall member 131B are not present. When the entire lens array unit 10 is viewed from the incident surface side, the transmitting portion (see FIG. 5A) formed by S-shaped openings (window portions) continuous to each other, which is formed by the first wall member 131A and the second wall member 131B cannot be visually recognized, and only a plurality of film through-holes 113 (see FIG. 3) provided in the light shielding film 110 can be visually recognized.

Operation of Lens Array Unit 10

In the lens array unit 10 configured as above, light reflected from the image reading region La passes through the light shielding film 110, the light shielding wall 130, the first lens array 170, and the second lens array 180 to form an image on the light receiving element 74. Here, the intermediate image forming surface is formed in the optical path between the first lens array 170 and the second lens array 180, and an erect real image of equal magnification is formed on the light receiving element 74 positioned on the emitting surface side of the second lens array 180.

In the present exemplary embodiment, the light shielding film 110 having a narrower opening than the window portion in the light shielding wall 130 is provided on the incident surface side of the light shielding wall 130 formed by the first wall member 131A and the second wall member 131B. Therefore, as compared with a case where the light shielding film 110 having the opening having the same shape as the window portion of the light shielding wall 130 is provided, light among light toward the light shielding wall 130 from the image reading region La, which is to be incident from a region between the first row R11 and the second row R12 in the light shielding film 110, can be regulated. Accordingly, light that is to be positioned on the outermost side at the focus in which an erect real image of equal magnification is formed can be shielded by the light shielding film 110. As a result, field angles of the first lens 173 and the second lens 183 are narrowed, the focal depth can increase.

By adopting the above configuration, a part of light among light reaching the inside of the light shielding wall 130 via the light shielding film 110, which is reflected by the optical axis groove 135 or the bottom portion 139 of the light shielding wall 130 can be cut, and thus stray light is less likely to occur. The stray light is light in which the ray of light emitted from an object point of an object surface reaches the position other than the corresponding image point on the image surface.

As described above, the light shielding film 110 is made of the resin material mixed with black pigment. As described above, by making the light shielding film 110 black, light reaching the light shielding film 110 can be suppressed from being reflected by the light shielding film 110.

Modification Example 1

FIGS. 6A to 6D are diagrams showing modification examples of a light shielding film 110.

A modification example of the light shielding film 110 will be described with reference to FIGS. 6A to 6D. In the above description, the light shielding film 110 (see FIG. 6A) has the substantially circular film through-hole 113 formed in the plate surface 111 having a substantially rectangular shape in a plan view, but the configuration is not limited thereto. As long as the light shielding film 110 is provided on the side opposite to the first lens 173 and the second lens 183 with the light shielding wall 130 interposed therebetween in the optical axial direction, and shields the part of light directed to the light shielding wall 130, the shape thereof is not particularly limited. That is, the shape of the opening provided in the regulating body may be an open shape such as a U shape, instead of a closed shape such as a circular shape shown in FIG. 3. Stated another way, the concept of the opening according to the present exemplary embodiment includes the shape with a frame (the closed shape) and the shape without a frame (the open shape).

Figure 6A:
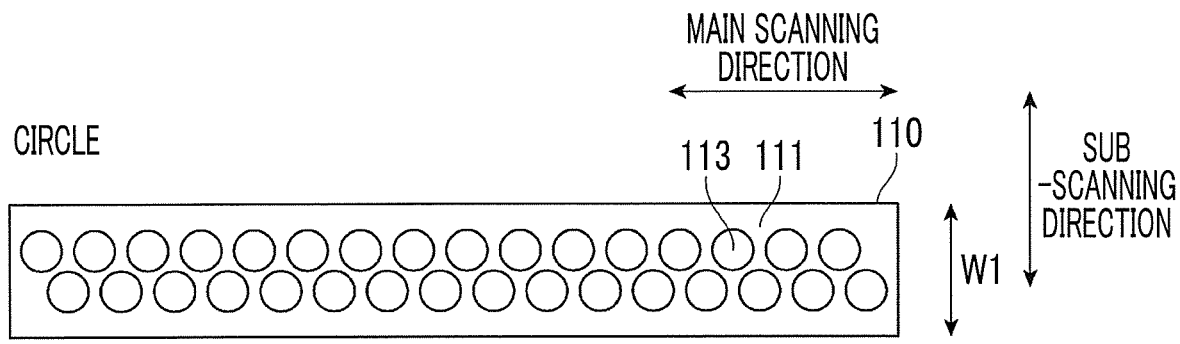
FIGS. 6A to 6D are diagrams for explaining modification examples of a light shielding film.
Figure 6B:
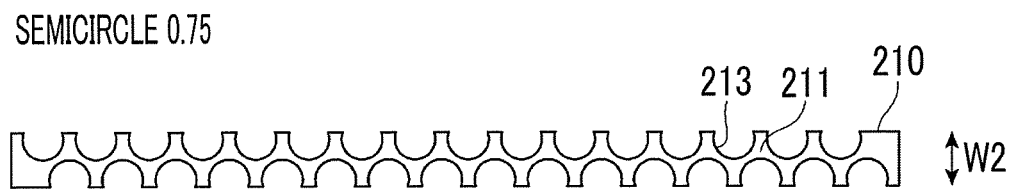

For example, as the light shielding film 210 shown in FIG. 6B, a configuration having a substantially semicircular through-hole 213 formed in the plate surface 211 having a substantially rectangular shape in a plan view may be adopted. The light shielding film 210 shown in FIG. 6B can be regarded as a shape in which both ends of the light shielding film 110 (see FIG. 6A) in the width direction is cut off. For example, in a case where a length W1 in a width direction of the light shielding film 110 is 2 mm, a length W2 in the width direction of the light shielding film 210 is 0.75 mm.

Figure 6C:
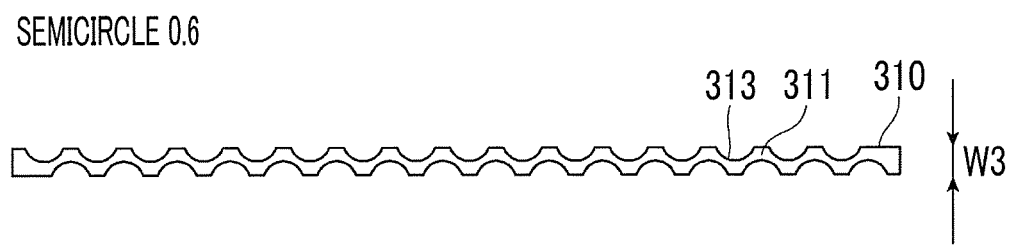

Also, similar the light shielding film 310 shown in FIG. 6C, a configuration having the through-hole 313 formed in the plate surface 311 having a substantially rectangular shape in a plan view may be adopted. The through-hole 313 has a substantially semicircular shape, more specifically, a so-called arch shape formed by a circular arc and chord occupying narrower region than the semicircle. The light shielding film 310 shown in FIG. 6C can be regarded as a shape in which both ends of the light shielding film 110 (see FIG. 6A) in the width direction is cut off. For example, in a case where the length W1 in the width direction of the light shielding film 110 is 2 mm, a length W3 in the width direction of the light shielding film 310 is 0.6 mm.

Figure 6D:
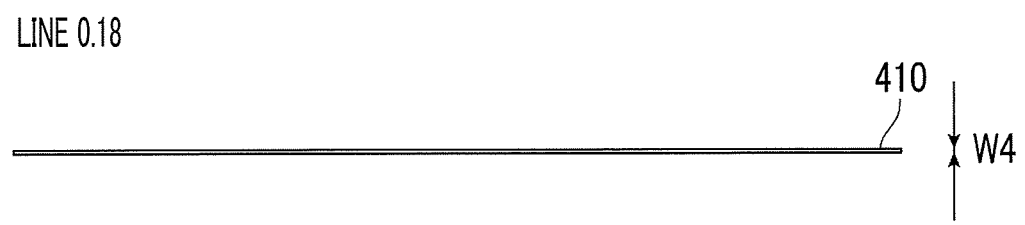

Also, similar to the light shielding film 410 shown in FIG. 6D, the first light shielding film may have a substantially rectangular shape in a plan view. That is, a configuration not having the film through-hole 113 (see FIG. 6A) may be adopted. The light shielding film 410 can be regarded as an elongate member disposed between the first row R71 and the second row R72 of the first lens 173 in the sub-scanning direction along the first row R71 and the second row R72. For example, a length W4 in the width direction of the light shielding film 410 is 0.18 mm.

Figure 7A:
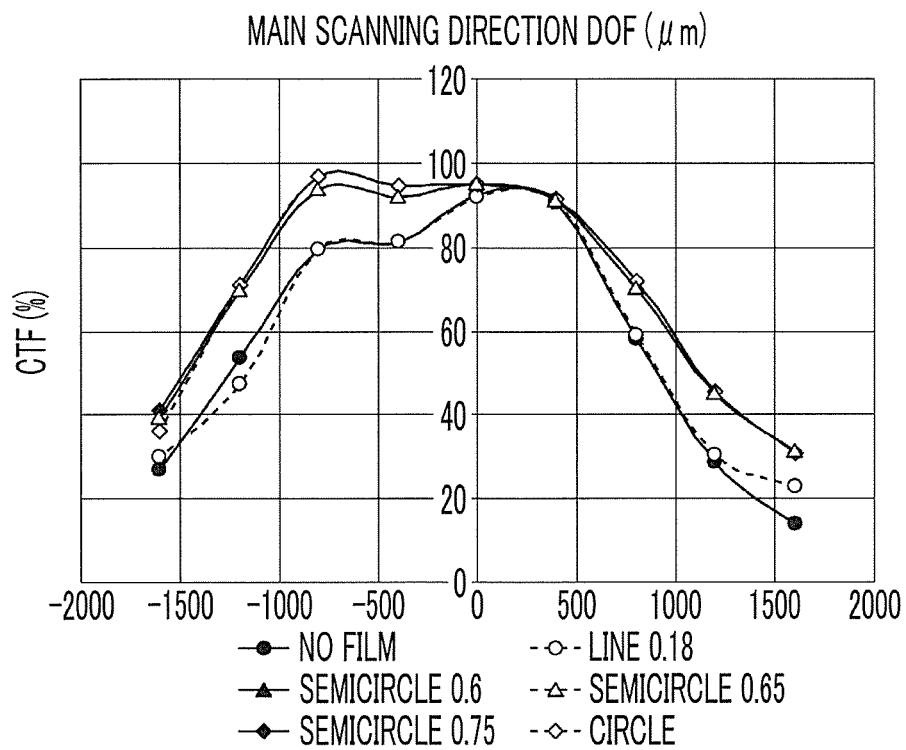
FIGS. 7A and 7B are diagrams showing results of simulation in which a shape of the light shielding film is changed.
Figure 7B:
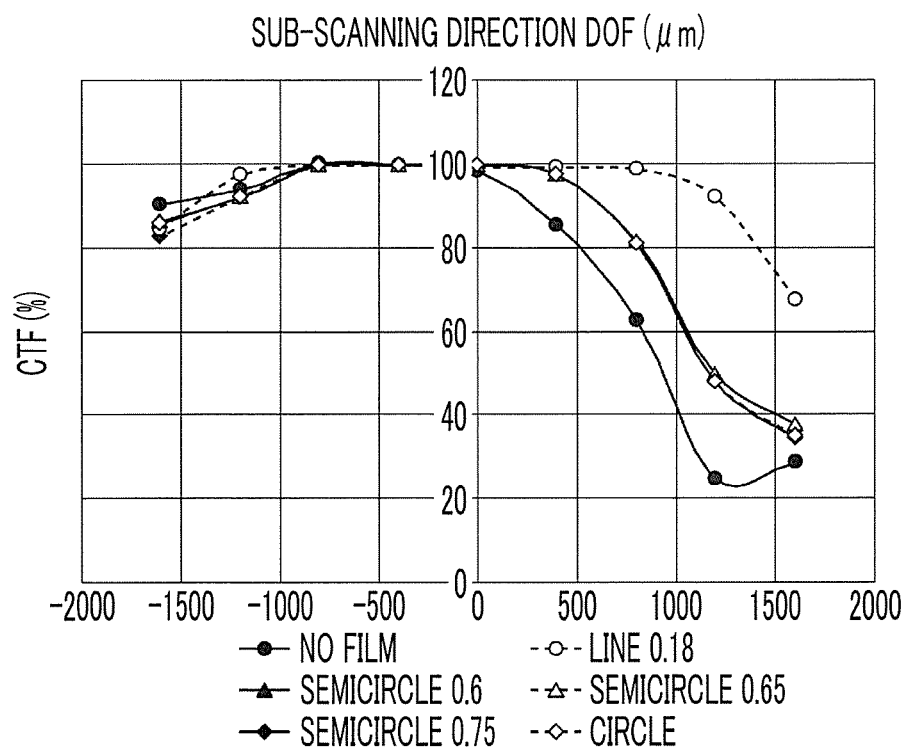

FIGS. 7A and 7B are diagrams showing results of simulation in which a shape of the light shielding film 110 is changed. More specifically, FIG. 7A is a diagram showing a result of simulation of the focal depth in the main scanning direction in a case where the shape of the light shielding film 110 is changed. FIG. 7B is a diagram showing a result of simulation of the focal depth in the sub-scanning direction and the resolution in a case where the shape of the light shielding film 110 is changed.

Incidentally, the resolution in FIGS. 7A and 7B is a relative value of the density contrast of the read image on the document G in a case where the density contrast of the line image data to be written is 100%. A condition of the simulation is that light shielding film 110 of each shape is disposed on the stacked body in which the light shielding wall 130, the first lens array 170, and the second lens array 180 are stacked on top of each other in this order, as the lens array unit 10 shown in FIG. 2.

Note that "semicircle 0.6" is a shape in which both sides of the light shielding film 110 in the sub-scanning direction are cut off and the length in the width direction of the light shielding film 110 is 0.6 mm. Further, for comparison, a condition in which the light shielding film 110 is not provided is "without film". Also, "line 0.18" is the light shielding film 410 in FIG. 6D, "semicircle 0.6" is the light shielding film 310 in FIG. 6C, "semicircle 0.75" is the light shielding film 210 in FIG. 6B, and "circle" is the light shielding film 110 in FIG. 6A.

A simulation result in a case where the shape of the light shielding film 110 is changed will be described with reference to FIGS. 6A to 6D and FIGS. 7A and 7B.

As shown in FIGS. 7A and 7B, regarding the above light shielding films 110, 210, 310, and 410, and the light shielding film of "semicircle 0.65" (not shown), the focal depth in the main scanning direction, and the focal depth in the sub-scanning direction are respectively simulated.

According to FIGS. 7A and 7B, greater focal depth is obtained in "line 0.18", "semicircle 0.6", "semicircle 0.65", "semicircle 0.75", and "circle" as compared to "without film". That is, the improvement of the optical performance (here, the focal depth) of the lens array unit 10 by disposing the light shielding film 110 is confirmed. Incidentally, in the light shielding film 410 which is "line 0.18", the focal depth in the sub-scanning direction shown in FIG. 7B is greater as compared to "without film".

Modification Example 2

Figure 8:
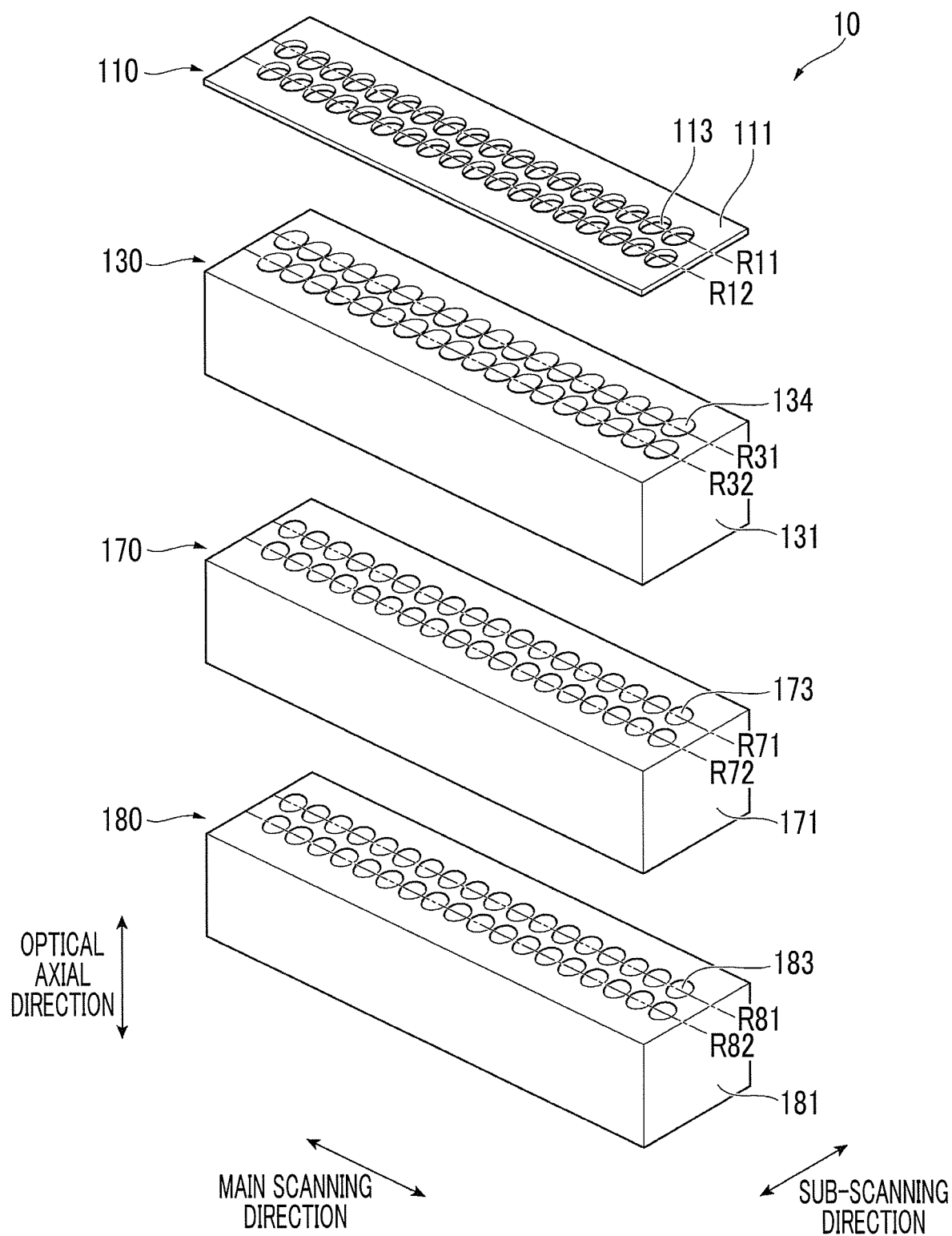
FIG. 8 is a diagram for explaining a modification example of the light shielding wall and an exploded perspective view of a lens array unit including the light shielding wall of the modification example.

FIG. 8 is a diagram for explaining a modification example of the light shielding wall 130 and an exploded perspective view of the lens array unit 10 including the light shielding wall 130 of the modification example. Since the lens array unit 10 shown in FIG. 8 has components (the light shielding film 110, the first lens array 170, and the second lens array 180) other than the light shielding wall 130 which are basically the same as in FIG. 3, the detailed description thereof is omitted.

Light Shielding Wall 130

As shown in FIG. 8, the light shielding wall 130 that is an example of the light shielding body is configured by a single wall member 131. More specifically, the light shielding wall 130 includes the wall member 131 provided with a plurality of wall through-holes 134.

The wall member 131 that is an example of the light shielding unit is made of a resin material mixed with black pigment (polycarbonate or acrylic resin), for example. The wall member 131 is a substantially rectangular parallelepiped member, and is disposed such that the longitudinal direction thereof is along the main scanning direction.

A plurality of wall through-holes 134 provided in the light shielding wall 130 have a substantially circular shape. The positions of wall through-holes 134 correspond to the first lens 173 and the second lens 183. That is, each wall through-hole 134 is formed at a position through which the optical axis of the first lens 173 passes. Also, the wall through-holes 134 are arranged in a first row R31 and a second row R32 along the main scanning direction. More specifically, each optical axis of the first lens 173 corresponds to each wall through-hole 134. From another viewpoint, each wall through-hole 134 provided in the light shielding wall 130 corresponds to each film through-hole 113 provided in the light shielding film 110. Here, the first row R31 of the light shielding wall 130 corresponds to the first row R11 of the light shielding film 110, and the second row R32 of the light shielding wall 130 corresponds to the second row R12 of the light shielding film 110.

Therefore, in a state where the lens array unit 10 is configured, each film through-hole 113 (an example of the opening) provided in the light shielding film 110 and each wall through-hole 134 (an example of the window portion) provided in the light shielding wall 130 overlap each other in the optical axial direction.

Relationship Between Light Shielding Wall 130 and Light Shielding Film 110

FIGS. 9A and 9B are diagrams for explaining the relationship between the wall through-hole 134 and the film through-hole 113 in the modification example of the light shielding wall 130. More specifically, FIG. 9A is a diagram for explaining a wall through-hole diameter D3 that is an inner diameter of the wall through-hole 134 provided in the light shielding wall 130. FIG. 9B is a diagram for explaining a film through-hole diameter D1 that is an inner diameter of the film through-hole 113 provided in the light shielding film 110.

In this example, the shape of each wall through-hole 134 provided in the light shielding wall 130 is circular. Also, the shape of each film through-hole 113 provided in the light shielding film 110 is circular. However, as shown in FIGS. 9A and 9B, the film through-hole diameter D1 that is an inner diameter of each film through-hole 113 is smaller than the wall through-hole diameter D3 that is an inner diameter of each wall through-hole 134 (D1<D3). In a state where the light shielding film 110 and the light shielding wall 130 overlap each other, a peripheral edge of each film through-hole 113 provided in the light shielding film 110 covers the inside of a peripheral edge of each wall through-hole 134 provided in the light shielding wall 130. When the entire lens array unit 10 is viewed from the incident surface side, a plurality of wall through-holes 134 formed in the wall member 131 cannot be directly visually recognized, and is visually recognized through a plurality of film through-holes 113 provided in the light shielding film 110.

Operation of Lens Array Unit 10

The lens array unit 10 shown in FIG. 8 also performs basically the same operation as the lens array unit 10 shown in FIG. 3. That is, in the lens array unit 10, light reflected from the image reading region La passes through the light shielding film 110, the light shielding wall 130, the first lens array 170, and the second lens array 180 to form an image on the light receiving element 74. Here, the intermediate image forming surface is formed in the optical path between the first lens array 170 and the second lens array 180, and an erect real image of equal magnification is formed on the light receiving element 74 positioned on the emitting surface side of the second lens array 180.

Figure 10A:
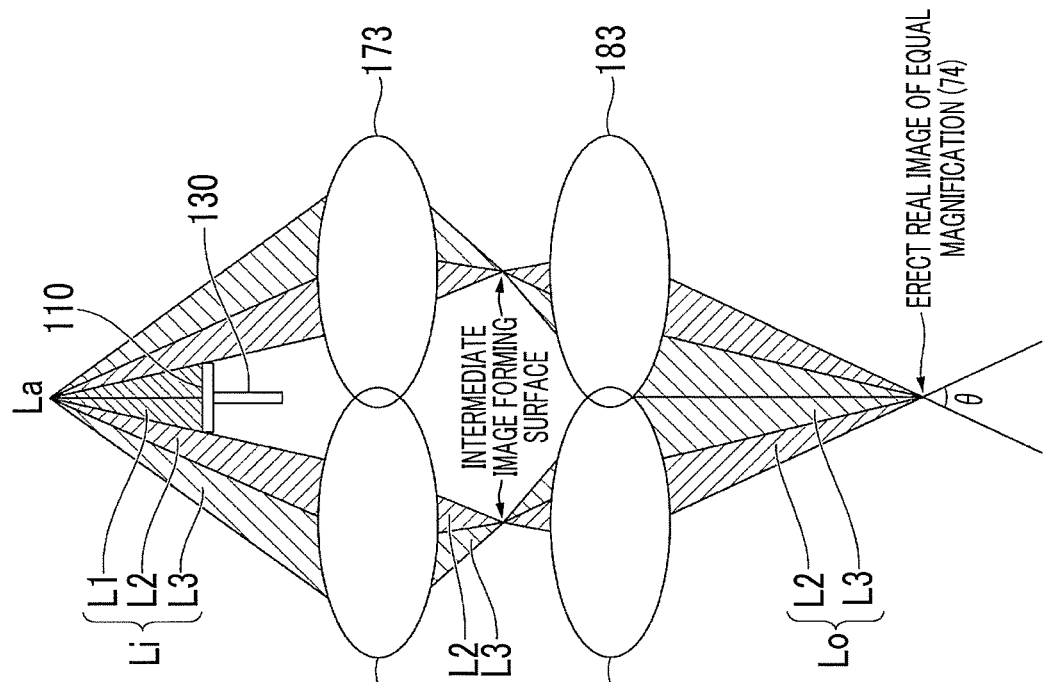
FIGS. 10A and 10B are diagrams for explaining the relationship between the presence or absence of the light shielding wall and the light shielding film in the lens array unit and the focal depth.
Figure 10B:
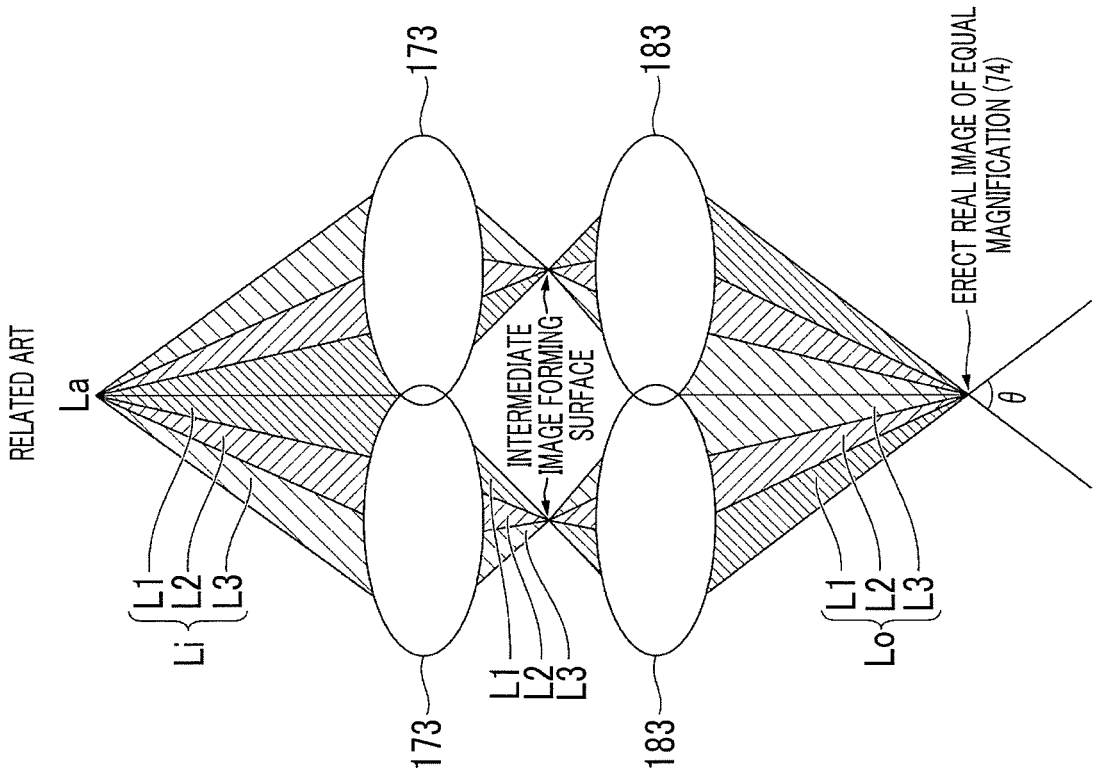

FIGS. 10A and 10B are diagrams for explaining the relationship between the presence or absence of the light shielding wall 130 and the light shielding film 110 in the lens array unit 10 and the focal depth. More specifically, FIG. 10A is a diagram for explaining a focal depth in a case where the light shielding wall 130 and the light shielding film 110 are not present, and FIG. 10B is a diagram for explaining a focal depth in a case where the light shielding wall 130 and the light shielding film 110 are present. FIGS. 10A and 10B show the light incidence and emission with respect to two lenses (the first lens 173 and the second lens 183) adjacent to each other in the main scanning direction. FIG. 10B shows a case where the opening formed by the light shielding film 110 covering the light shielding wall 130 is narrower than the window portion formed by the light shielding wall 130.

First, a configuration in the related art will be described with reference to FIG. 10A.

Light reflected by the image reading region La is toward two adjacent first lenses 173 as incident light Li. For convenience, the incident light Li will be described by being divided into first light L1, second light L2, and third light L3. The first light L1 is light toward a boundary part side of two adjacent first lenses 173 of the incident light Li. The second light L2 is light adjacent to the first light L1 in the main scanning direction among the incident light Li and is toward a center part side of each of two adjacent first lenses 173. The third light L3 is light that is adjacent to the second light L2 in the main scanning direction of the incident light Li and is toward an end part side opposite to the boundary part of each of two adjacent first lenses 173.

The incident light L1 incident from the incident surface of each first lens 173 is emitted from each emitting surface. Light emitted from the emitting surface of each first lens 173 is in the order of the first light L1, the second light L2, and the third light L3 as viewed from the boundary part side of the first lenses 173, similar to the incident surface side of each first lens 173. Light passing through each first lens 173 is condensed by action of each first lens 173 to form the intermediate image forming surface between each first lens 173 and each second lens 183, is diffused, and is toward two adjacent second lenses 183. Light incident on the incident surface of each second lens 183 is in the order of the third light L3, the second light L2, and the first light L1 as viewed from the boundary part side of the second lenses 183. As above, the order of the first light L1 to the third light L3 is reversed between the incident surface side of each first lens 173 and the incident surface side of each second lens 183.

Light incident from the incident surface of each second lens 183 is emitted from each emitting surface. Here, light emitted from the emitting surface of each second lens 183 is referred to as emission light Lo. On the emitting surface side of each second lens 183, the emission light Lo is in the order of the third light L3, the second light L2, and the first light L1 as viewed from the boundary part side of the second lenses 183, similar to the incident surface side of each second lens 183. The emission light Lo passing through each second lens 183 is condensed by action of each second lens 183 to form an erect real image of equal magnification on the emitting surface side (the light receiving element 74 side) of each second lens 183. As above, in the configuration in the related art, the emission light Lo formed by three of the first light L1, the second light L2, and the third light L3 forms an erect real image of equal magnification. An angle formed by the emission light Lo at the time of being condensing is referred to as a condensing angle θ.

Next, a configuration of the modification example 2 will be described with reference to FIG. 10B.

Light reflected by the image reading region La is toward two adjacent first lenses 173 as incident light Li including the first light L1, the second light L2, and the third light L3. However, in this case, the light shielding wall 130 and the light shielding film 110 are provided on the incident surface side of each first lens 173. Therefore, the first light L1 of the incident light Li which is positioned on the innermost side is shielded by the light shielding film 110. As a result, the second light L2 and the third light L3 of the incident light Li reach two adjacent first lenses 173.

The second light L2 and the third light L3 incident from the incident surface of each first lens 173 are emitted from each emitting surface. Light emitted from the emitting surface of each first lens 173 is in the order of the second light L2, and the third light L3 as viewed from the boundary part side of the first lenses 173, similar to the incident surface side of each first lens 173. Light passing through each first lens 173 is condensed by action of each first lens 173 to form the intermediate image forming surface between each first lens 173 and each second lens 183, is diffused, and is toward two adjacent second lenses 183. Light incident on the incident surface of each second lens 183 is in the order of the third light L3 and the second light L2 as viewed from the boundary part side of the second lenses 183. As above, the order of the second light L2 and the third light L3 is reversed between the incident surface side of each first lens 173 and the incident surface side of each second lens 183.

Light incident from the incident surface of each second lens 183 is emitted from each emitting surface as the emission light Lo. On the emitting surface side of each second lens 183, the emission light Lo is in the order of the third light L3 and the second light L2 as viewed from the boundary part side of the second lenses 183, similar to the incident surface side of each second lens 183. The emission light Lo passing through each second lens 183 is condensed by action of each second lens 183 to form an erect real image of equal magnification on the emitting surface side (the light receiving element 74 side) of each second lens 183. As above, in the configuration in the modification example 2, the emission light Lo formed by two of the second light L2 and the third light L3 excluding the first light L1 forms an erect real image of equal magnification. In this case, since the light shielding film 110 and the light shielding wall 130 are provided, the first light L1 to be positioned on the outermost side in the emission light Lo is excluded from the emission light Lo, thus the condensing angle θ is smaller than the condensing angle in the related art shown in FIG. 10A, and the focal depth can be made deeper (larger).

Modification Example 3

In the above modification example, the wall through-hole 134 provided in the light shielding wall 130 has a circular shape, and the film through-hole 113 provided in the light shielding film 110 has also a circular shape, but the shapes are not limited thereto.

FIGS. 11A and 11B are diagrams for explaining the relationship between the wall through-hole 134 and the film through-hole 113 in a modification example of the light shielding film 110. More specifically, FIG. 11A is a diagram for explaining the wall through-hole 134 provided in the light shielding wall 130. FIG. 11B is a diagram for explaining the film through-hole 113 provided in the light shielding film 110. Since the lens array unit 10 has components (the light shielding wall 130, the first lens array 170, and the second lens array 180) other than the light shielding film 110 which are basically the same as in FIG. 8, the detailed description thereof is omitted.

In the example, the wall through-hole 134 provided in the light shielding wall 130 has a circular shape, whereas the film through-hole 113 provided in the light shielding film 110 has a non-circular shape. More specifically, in the film through-hole 113 provided in the light shielding film 110, both ends in the sub-scanning direction is substantially circular, and both ends in the main scanning direction is substantially linear. Accordingly, light of the incident light Li toward both ends in the main scanning direction of each first lens 173 is regulated.

In a case where the configuration shown in FIG. 9B is adopted, the area of the film through-hole 113 provided in the light shielding film 110 becomes small, and there is a concern that the amount of light in the obtained erect real image of equal magnification is insufficient. On the other hand, in a case where the configuration shown in FIG. 11B is adopted, the greater area of the film through-hole 113 provided in the light shielding film 110 than the area in the configuration of FIG. 9B can be secured, and the amount of light in the obtained erect real image of equal magnification can suppressed from being insufficient. Also, by adopting the configuration shown in FIG. 11B, the situation is less likely to occur that light incident on a certain film through-hole 113 is incident on the first lens 173 provided corresponding to other film through-hole 113 adjacent to the film through-hole 113 in the main scanning direction.

Others

In the present exemplary embodiments, the light shielding film 110 made of a resin material mixed with black pigment is used, but the material is not limited thereto. For example, the light shielding film 110 formed by applying black pigment to a film made of a transparent resin material through printing may be used. In this case, a light transmitting portion that transmits light may be provided by punching a specific portion of the light shielding film 110, or a light transmitting portion may be provided by not performing printing at a specific portion of the light shielding film 110.

In the present exemplary embodiments, the transmitting portion is configured by providing a space (the through-hole) in the light shielding wall 130, but the configuration is not limited thereto. The light shielding wall 130 may be configured by a combination of the light shielding unit made of a resin having no light transmitting property and the transmitting portion made of a translucent resin, or by printing the transmitting portion and the light shielding unit on the surface of the transparent member.

In the present exemplary embodiments, two lens arrays (the first lens array 170 and the second lens array 180) configure the lens body, but the configuration is not limited thereto. That is, the number of lens arrays may be one, or three or greater as long as the intermediate image forming surface for forming an erect real image of equal magnification is formed in the optical path.

In the present exemplary embodiments, a plurality of first lenses 173 configuring the first lens array 170 and a plurality of second lenses 183 configuring the second lens array 180 are arranged in two rows respectively, but the arrangement is not limited thereto. For example, the first and second lenses may be arranged in three or greater rows, respectively.

Although the light shielding film 110 and the light shielding wall 130 are separately configured in the present exemplary embodiments, the light shielding film 110 and the light shielding wall 130 may be integrally formed, or may have a shape narrowed toward the document side (the incident surface side).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical device comprising:
    a lens body including a plurality of lenses of which optical axes are arranged alongside each other, and having an intermediate image forming surface for forming an erect real image of equal magnification formed in an optical path;
    a light shielding body that is provided to face a light incident surface of the lens body, and includes a transmitting portion that is positioned on the optical axes of the plurality of lenses and transmits light and a light shielding unit that is positioned on a portion other than the optical axes of the plurality of lenses and shields the passage of light; and
    a regulating body that is provided to face a light incident surface of the light shielding body, includes an opening narrower than the transmitting portion, and regulates a part of light toward the transmitting portion.

2. The optical device according to claim 1,
wherein the light shielding body includes
    a base that is provided on a side of the plurality of lenses along an arrangement direction in which the plurality of lenses are arranged, and
    a plurality of projecting portions that are positioned between the lenses of the plurality of lenses and project from the base in an intersection direction intersecting the arrangement direction, and
the regulating body covers a part of a region of the light shielding body in which the base and the plurality of projecting portions are not present.

3. The optical device according to claim 2,
wherein the plurality of lenses are arranged in a first row and a second row along the arrangement direction,
the light shielding body includes
    a first light shielding body including a first base that is provided on a side of the lenses in the first row along the arrangement direction, and a plurality of first projecting portions that are positioned between the lenses in the first row and project from the first base in the intersection direction, and
    a second light shielding body including a second base that is provided, on a side of the lenses in the second row, along the arrangement direction on an opposite side of the first base with the lenses in the first row and the lenses in the second row interposed therebetween, and a plurality of second projecting portions that are positioned between the lenses in the second row and project from the second base in the intersection direction, and
the regulating body covers a part of a region of the light shielding body in which the first light shielding body and the second light shielding body are not present.

4. The optical device according to claim 3,
wherein the regulating body covers a portion in which the plurality of first projecting portions of the first light shielding body and the plurality of second projecting portions of the second light shielding body face each other along the arrangement direction.

5. The optical device according to claim 1,
wherein the light shielding body includes the light shielding unit that covers a portion other than the incident surface of each of the plurality of lenses, and the transmitting portion that is formed by a plurality of window portions provided in the light shielding unit, and
the regulating body covers the light shielding unit of the light shielding body and an inside of a peripheral edge of each of the plurality of window portions forming the light shielding unit.

6. The optical device according to claim 5,
wherein the regulating body is provided with the opening corresponding to each of the plurality of lenses, and
a diameter of the opening provided in the regulating body is smaller than a diameter of the window portion provided in the light shielding body.

7. The optical device according to claim 1,
wherein the lens body includes
- a first lens body that includes a plurality of first lenses of which optical axes are arranged alongside each other, is provided to face a light emitting surface of the light shielding body, and has the intermediate image forming surface formed by light transmitted through the plurality of first lenses, and
- a second lens body that includes a plurality of second lenses of which optical axes are arranged alongside each other and is provided to face a light emitting surface of the first lens body, and on which light passing through the first lens body to form the intermediate image forming surface is incident, and the regulating body regulates light incident on a peripheral side of each of the plurality of first lenses provided in the first lens body.

8. An image reading apparatus comprising:
a light source that irradiates a document with light;
a lens body including a plurality of lenses of which optical axes are arranged alongside each other and through which light reflected from the document passes;
a light shielding body that is provided to face a light incident surface of the lens body, and includes a transmitting portion that is positioned on the optical axes of the plurality of lenses and transmits light, and a light shielding unit that is positioned on a portion other than the optical axes of the plurality of lenses and shields the passage of light;
a regulating body that is provided to face a light incident surface of the light shielding body, includes an opening narrower than the transmitting portion, and regulates a part of light toward the transmitting portion; and
a light receiving element that receives light passing through the plurality of lenses.

9. An image forming apparatus comprising:
a light source that irradiates a document with light;
a lens body including a plurality of lenses of which optical axes are arranged alongside each other and through which light reflected from the document passes;
a light shielding body that is provided to face a light incident surface of the lens body, and includes a transmitting portion that is positioned on the optical axes of the plurality of lenses and transmits light, and a light shielding unit that is positioned on a portion other than the optical axes of the plurality of lenses and shields the passage of light;
a regulating body that is provided to face a light incident surface of the light shielding body, includes an opening narrower than the transmitting portion, and regulates a part of light toward the transmitting portion;
a light receiving element that receives light passing through the plurality of lenses; and
an image forming unit that forms an image based on light received by the light receiving element.

* * * * *